United States Patent [19]

Muller et al.

[11] Patent Number: 5,781,008
[45] Date of Patent: Jul. 14, 1998

[54] INSTANTANEOUS SLAG THICKNESS MEASURING DEVICE

[75] Inventors: Joachim Muller; Hartmut Haubrich, both of Aachen, Germany

[73] Assignee: Amepa Engineering GmbH, Aachen, Germany

[21] Appl. No.: 705,991

[22] Filed: Aug. 30, 1996

Related U.S. Application Data

[63] Continuation-in-part of Ser. No. 378,232, Jan. 25, 1995, abandoned.

[30] Foreign Application Priority Data

Jan. 28, 1994 [DE] Germany .................. 44 02 463.0

[51] Int. Cl.⁶ .................. G01B 7/06; G01R 33/12
[52] U.S. Cl. .................. 324/230; 324/226; 324/234
[58] Field of Search .................. 324/229, 230, 324/226, 227, 243, 262, 234, 236, 239

[56] References Cited

U.S. PATENT DOCUMENTS 5,523,685  6/1996  Kasai et al. .................. 324/229

*Primary Examiner*—Walter E. Snow
*Attorney, Agent, or Firm*—Paul J. Sutton

[57] ABSTRACT

An apparatus for measuring the thickness of a slag layer on a metal melt in a metallurgical vessel comprises a first inductive eddy current sensor which indicates the distance of the apparatus from the metal melt as it is moved toward the melt. A second sensor detects when the apparatus reaches a predetermined distance relative to or contacts the slag layer and triggers the inductive eddy-current sensor when such distance is attained. The sensors are arranged in predetermined spatial relation and the thickness of the slag layer is determined by an evaluation device which analyzes the received signals. The apparatus permits measurement of the thickness of the slay layer without the need of additional equipment (e.g. mechanical lance movement or distance measurement).

9 Claims, 2 Drawing Sheets

6 (CAPACITIVE PROXIMITY SWITCH, OR
CAPACITIVE DISCHARGE SENSOR, OR
ELECTRICAL CONTACT SENSOR)

INSTANTANEOUS SLAG THICKNESS MEASURING DEVICE

This application is a continuation-in-part of U.S. patent application Serial No.08/378.232 filed Jan. 25, 1995, now abandoned.

FIELD OF THE INVENTION

This invention relates to an apparatus for discontinuously determining the thickness of a hot slag layer o a metal melt in a metallurgical vessel, with the use of a probe which can be moved toward or on to the melt. The probe can be connected to at least one evaluation device and provides a signal for the distance of the probe to the metal melt and a trigger signal when the slag layer is reached or at a predetermined distance therefrom.

PRIOR ART

Apparatuses of this type which are generally known are used in metal production. In particular, during various scavenging operations performed on a metal melt the non-metallic constituents contained therein collect at the melt surface as a result of the processing and form viscous or solid slag layers there which protect the melt from the effects of the atmosphere and from excessive heat losses. These devices must be capable of performing in the harsh environments encountered in proximity to metal melts.

For the same purpose and/or for metallurgical reasons, additives are sometimes brought into the vessel to control the metallurgical activity of the slag. Normally the mixture of all constituents of the top layer on the metal melt are referred to as "slag", the thickness of this layer is referred to as slag depth.

Various apparatuses are known for determining the thickness of the slag layer, on which the further processing stages of metal production depend.

An apparatus for determining the slag depth in a metal melt is known from Hagglund (DE 36 41 987 A1), wherein a support constructed as a lance is utilized. The latter is provided with a hum detector which is connected to an antenna which detects the mains hum in the vicinity of the antenna. When the lance is immersed in the metal melt, the hum detector detects the air/slag interface, and an inductive sensor indicates when the interface between the slag and the metal melt has been reached. In order to determine the slag depth from these measurements, the signals obtained in this manner must be related to a continuous distance measurement. The requirement of coupling the apparatus to external distance measuring devices impairs the mobility of the apparatus, and in particular prevents measurements from being made with a manually operated lance.

An apparatus for determining the level of a slag interface in a metal melt is known from Ericksson (DE 38 32 763 AI). This apparatus is based on the principle of detecting a change in impedance via an impedance circuit, and is connected to an oscillator and to a measuring plunger, or to a measuring plunger supply cable. The oscillator operates at a frequency which is different from that of the mains. Changes in impedance are detected by means of a synchronous detector. When the output signal of the synchronous detector exceeds that of a predetermined circuit associated with the corresponding interfaces, indicates that the measuring plunger is situated at a defined distance from the corresponding interface. Here also the slag depth can only be determined by relating the signals from the threshold value circuits to an additional, continuous distance measurement.

In addition to the aforementioned disadvantage of mobility impairment, this technique also necessitates that the rate of immersion is held constant with particular precision, since the quality of the change in impedance is strongly affected by distance and rate of immersion.

An apparatus constructed as a lance for determining slag depth is known from Kawamura (JP-A-61212702). With this apparatus is based on the principle of detecting a change in impedance via an impedance circuit, and is connected to an oscillator and to a measuring plunger, or to a measuring plunger supply cable. The oscillator operates at a frequency which is different from that of the mains. Changes in impedance are detected by means of a synchronous detector. When the output signal of the synchronous detector. When the output signal of the synchronous detector exceeds that of a predetermined circuit associated with the corresponding interfaces, corresponding threshold value circuits generate a signal which indicates that the measuring plunger is situated at a defined distance from the corresponding interface. Here also the slag depth can only be determined by relating the signals from the threshold value circuits to an additional, continuous distance measurement. In addition to the aforementioned disadvantage of mobility impairment, this technique also necessitates that the rate of immersion is held constant with particular precision, since the quality of the change in impedance is strongly affected by distance and rate of immersion.

An apparatus constructed as a lance for determining slag depth is known from Kawamura (JP-A-61212702). With this apparatus a lance tip is immersed in the metal melt with an electrode at the lance tip, whereupon the impedance between the electrode and the melting vessel changes in the air/slag and slag/metal melt transition regions. These changes in impedance are evaluated by threshold valued circuits and again have to be related to a continuous distance measurement in order to determine the slag depth from them.

A method of continuously determining the thickness of a liquid slag layer on the surface of a metal melt is known from Krausener (EP 0421828 A1). In this method, the distance to the melt surface is continuously measured by a level sensor which is installed as a fixed component. An isothermal block is held at a powder/liquid slag layer transition by means of a controlled tracking device. In this connection, the tracking device requires a distance measuring device which records the position of the isothermal block in order to determine the slag thickness from the difference in the results of the two measuring devices. The continuous individual measurement provided by this method is more time-consuming than a discontinuous measurement and accelerates the wear on the isothermal block. In addition, an expensive traveling device is required, which comprises distance measurement and a controller for the isothermal block.

Davies (U.S. Pat. No. 4,841,770) describes a method for determining the amount of substance in a vessel in which method two electrodes generate a current flow in response to their contact with the surface of the substance. The level of this shiftable electrode at which the current flow begins is determined by a distance measuring device which is based on emitting and receiving waves. To generate an appropriate distance signal, the shiftable electrodes are equipped with a reflector.

This invention is not suitable to measure the slag depth in metallurgical vessels as it does not enable to detect the air/slag interface. Its use to detect the position of a metal layer in metal melts is limited by the fact, that the reflector would be imposed to metal splashes in the vessel leading to a change in its properties.

A disadvantage which is common to the known apparatus and methods described above is that the measurements necessitate expensive traveling (rate of movement) devices, and in addition necessitate devices which reliably record the distances traveled. Insofar as appropriate devices already exist, these therefore still have to be retrofitted at least with devices for recording the distance traveled.

An apparatus for determining slag depth which does not necessarily require a distance measuring device is already known from Nippon Steel (JP-A-00247539). This apparatus comprises a lance, the tip of which is provided with a nozzle from which an inert gas flows. The prevailing impact pressure, which first exhibits a moderate increase at the air/slag interface and then increases sharply at the slag/liquid metal interface is determined by a pressure sensor. The slag thickness is determined from the pressure difference from the entry into the slag until the entry into the metal melt, taking into consideration the prevailing slag density. However, this principle of measurement can only be utilized for viscous slags. Even then the impact pressure is influenced not only by the density but also by the depth of immersion and by viscosity variations, which in slag layers can range from liquid to the solid state. Another disadvantage of this apparatus is that transitions are not detected distinctly and the measurement of thin slag layers is practically impossible. If a distance measuring device is dispensed with, the rate of immersion has to be kept low and constant, since otherwise transitions between slags and metal melts cannot be identified under some circumstances.

Falcoff (U.S. Pat. No. 4,977,853) discloses a device for continuously measuring the thickness of a paint film applied on a substrate, using an optical sensor and an inductive proximity sensor. The optical sensor measures the distance between the device and the upper surface of the paint film, while the proximity sensor measures the distance between the device and the upper surface of the substrate. The two distances measured, when compared, continuously produce the film thickness value.

The reason why this device would fail when used in a metallurgical vessel mainly resides in the fact that, because of the prevailing environmental conditions, it is not possible to lower a combination of an optical and an inductive sensor will detect the steel level and, on the other hand, the optical sensor will not be overheated. It is thus not possible to solve the problem underlying the present application with the disclosed sensor arrangement.

For similar reasons, the device disclosed in Falcoff et. al. (U.S. Pat. No. 5,062,298) would fail to measure the slag depth in metallurgical vessels. In this disclosure, the optical device of the invention mentioned above is replaced by an ultrasonic sensor. An additional disadvantage is, that ultrasonic distance sensors are not accurate in hot environments, as strong changes in the temperature of the air between the sensor and the interface lead to strong changes in the velocity of sound which leads to varying measurements.

Baumert (U.S. Pat. No. 4,098,128) discloses acoustically measuring the slag depth in a refining crucible by deriving the slag depth from a measurement of the sound of the oxygen lance: the deeper the slag the more sound is absorbed in the crucible.

Baumert (U.S. Pat. No. 4,369,877) discloses a more specific detail of an acoustically working system in which the microphone in accordance with the aforementioned patent is positioned above the refining crucible and cooled by a coolant circuit. This reference is of no relevance to the present application.

Such acoustic devices have the disadvantage that they require an application specific signal analysis to calculate the slag depth from acoustic signals. As acoustic signals are influenced by a lot of parameters the result is neither very accurate nor very reliable over a longer period.

Canfield (U.S. Pat. No. 4,302,623) discloses conventional ultrasonic batch sensing which distinguished over apparatuses as known throughout the art by the mere fact that, by positioning an air nozzle, a calculated disturbance of a thermal inversion layer is attained permitting an ultrasonic measurement even in hot surroundings (i.e. within the furnace). Even when several sensors are provided, all these sensors detect the same interface, while different interfaces are to be detected to measure the thickness of a layer. This citation discloses one sensor only although in the specification, column 4, it is mentioned that the level of the batch can also be measured by similar or other suitable sensing means. This is, however, not described in detail.

Sukahara et. al. (U.S. Pat. No. 4,625,556) disclose ultrasonic thickness sensing of a layer on a substrate by means of frequency discriminating absorption. At the inclined impact of an impulsive ultrasonic wave having wide-range of frequency components on a thin layer the thickness of which is to be in the order of magnitude of the wave length, a certain frequency is nulled which frequency points to the thickness. This system would hardly be adopted to measure the slag depth in metallurgical vessels, as it is difficult and/or expensive to acoustically connect an ultrasonic transducer to hot slags.

Linder (U.S. Pat. No. 4,794,335) discloses electromagnetically measuring the thickness of the layer of remaining molten metal at the bottom of a container. An alternating magnetic field is generated with a frequency such that the penetration depth of the magnetic field in the metal is of the same order of magnitude as the residual thickness of the melt layer of interest for the measurement.

An important requirement for this method is, that the electrical conductivity of the layer to be measured is known. This is not the case for slag depth measurements, as the electrical conductivity of slag is strongly dependent on its temperature and chemical composition. The variation in conductivity can be an order of magnitude or more.

Furthermore this method is not advantageous for the measurement of the thickness of a slag layer, as the frequency would be very high due to the low electrical conductivity of slag. Under the environmental conditions of metallurgical vessels it is difficult and/or expensive to guide signals of such high frequencies to appropriate evaluation circuitry to perform the desired signal processing.

Morley (U.S. Pat. No. 4,912,410) discloses an electromagnetic distance sensor which is moved by a cushion of air in a distance above a coating and the distance to a substrate, e.g. aluminum, is measured. When the thickness of the coating is varied and the thickness of the air cushion held constant, the thickness of the coating can be determined from the change of the distance signal. This system is not appropriate to measure the slag depth in metallurgical vessels, as slag layers are typically viscous and therefore it would be difficult to find a suitable way to control the cushion of air. The use of an air cushion is not accurate as the slag layer may be moving up and down due to movements of the vessel.

OBJECT OF THE INVENTION

The underlying object of the present invention is to construct an apparatus so that reliable determination of the slag depth in metallurgical vessels is ensured at a low probe cost. In particular, the object is to ensure that the measurement depends neither on a traveling device nor on a determination of distance traveled. Furthermore the apparatus has to be suitable for the extreme heat and like severe environmental conditions encountered in metallurgical vessels.

SUMMARY OF THE INVENTION

This object is achieved by providing a probe shiftable toward the slag layer/metal melt and comprising a first inductive eddy current sensor for generating a signal indicating the distance of said first sensor from the metal melt, a second sensor in predetermined spacial relation to the first sensor, the second sensor being adapted to emit a signal when the second sensor is a predetermined distance relative to the slag layer, i.e., zero or more, and to trigger said first sensor when the second sensor reaches said predetermined distance, and evaluation means for receiving and analyzing said first and second signals and deriving the thickness of said slag layer from a comparison of the first and second signals. Both sensors together will be referred to as "sensor arrangements".

The second sensor which is combined with the first inductive eddy current sensor can either be an electromagnetic proximity switch, a capacitive discharging sensor an electrically contacting sensor or an acceleration sensor.

The housing of the sensor arrangement can be made of ceramic and/or cardboard and/or plastic. Housing and sensor arrangement together are referred to as "probe". The probe can be removably mounted to a lance.

DETAILED DESCRIPTION OF THE INVENTION

Figure 1:
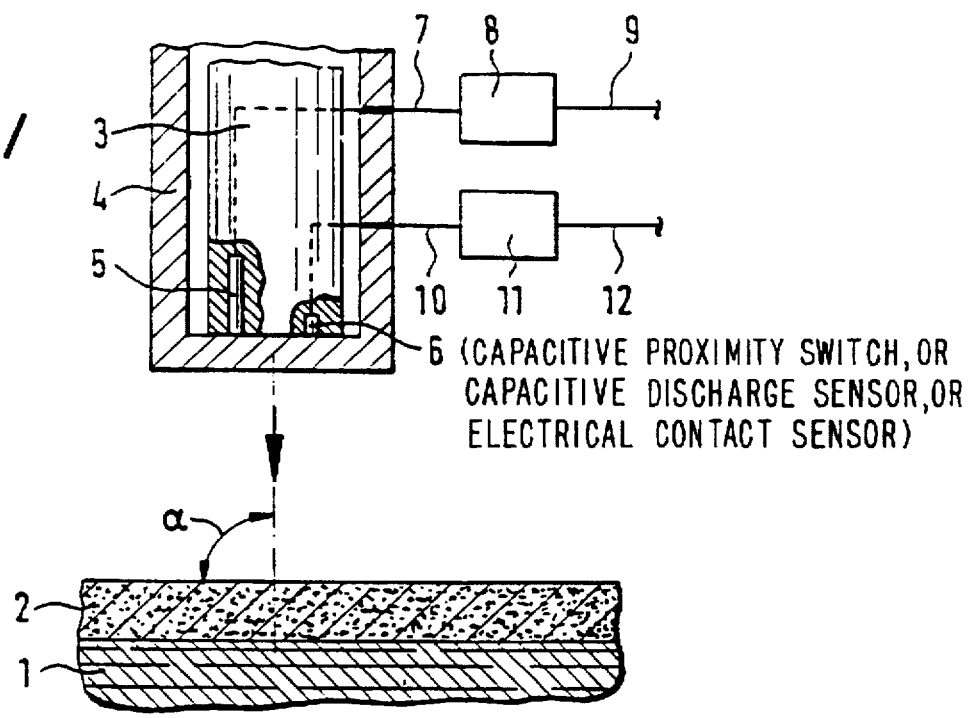
FIG. 1 diagrammatically illustrates a probe.

The probe can be moved vertically—preferably at an angle $\alpha=90°$—toward a metal melt 1 which is covered by a slag layer 2, the thickness of which is to be determined.

When the probe approaches the layer, it is able to pass through the layer.

The apparatus contains a lance 3, which is illustrated as a broken-off portion, and which is encapsulated in a protective tube 4, which is likewise illustrated as a broken-off portion. A first sensor 5 and a second sensor 6 are disposed side by side in the distal end of the lance 2 so that they terminate flush with the end of the lance 3 or in predetermined spaced relation.

The apparatus according to the invention enables the slag layer thickness to be measured on metal melts in metallurgical vessels without having to take into account the distance traveled by the probe or the speed of travel.

In particular, this is made possible in that a first sensor 5 is constructed as an inductive eddy current type of sensor which generates a first signal from which the existing distance of the first sensor 5 from the metal melt 1 can be determined while the probe is moved toward the melt. Such sensors are known throughout the art. In the present application it has to be ensured, that the slag layer does not affect the signal of the first sensor. This is determined by the penetration depth ($\delta$) of the alternating magnetic field of the working frequency f in the slag layer given by $$\delta = \sqrt{(2/\omega\chi\mu)}$$

with $\delta$=penetration depth
$\omega=2 * PI * f$
$\chi$=conductivity of slag layer
$\mu$=permeability of slag layer The penetration depth $\delta$ of the field of the first sensor in the slag has to be large, this can be achieved by selecting an adequately low working frequency (<100 kHz), typically useful are frequencies between 10 and 50 kHz.

In association with a second sensor 6 which provides a simple signal, i.e. a switching signal, when the top of the slag layer is reached, it is possible to make a direct thickness measurement, in that the distance signal to the metal melt is evaluated by the evaluation device at the time when the switching signal indicates that the slag layer has been reached.

The first sensor 5 is connected via a line 7 to a first preliminary processing device 8, which stands here for the signal processing steps amplification and linearization of the signal of the first sensor to produce a distance signal of the probe to the melt. This unit is connected via a line 9 to an evaluation device 13.

Figure 4:
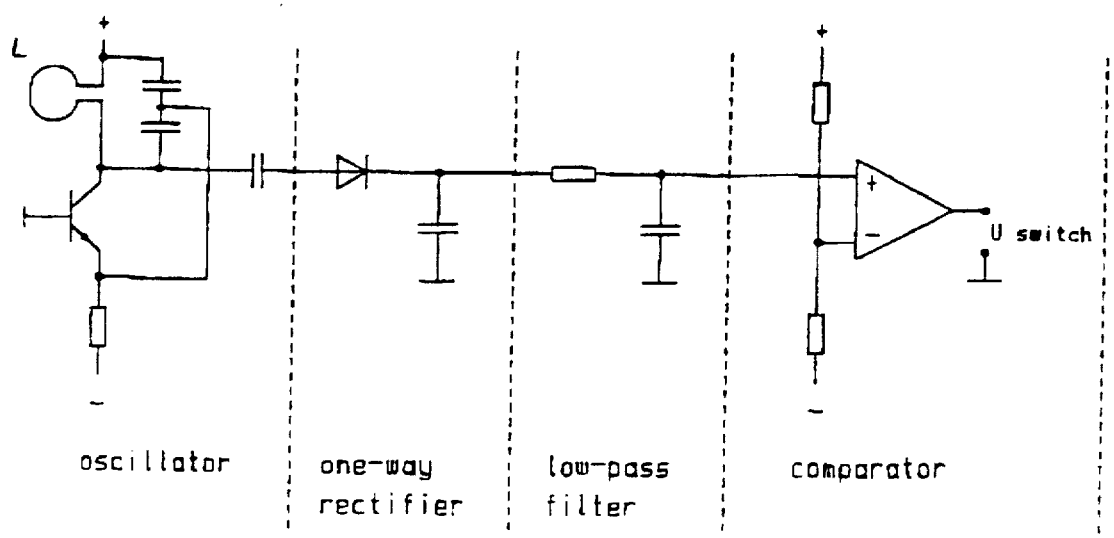
FIG. 4 illustrates a typically useful circuit for an inductive proximity switch to detect slag layers.

The second sensor 6 is connected via a line 10 to a second preliminary processing device 11, which stands here for the signal processing steps amplification and comparison to produce a switch signal (see below and FIG. 4). This unit is connected via a line 12 to the evaluation device 13.

Figure 2:
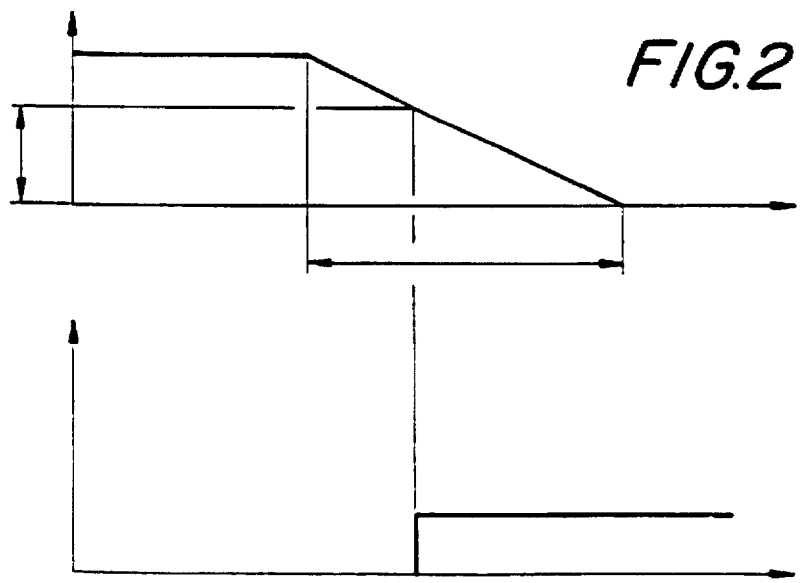
FIG. 2 illustrates a signal evaluation graph.

As illustrated in FIG. 2, the first signal from the first sensor 5 is evaluated when the second sensor 6 generates the second signal indicating the defined distance from or engagement with the slag layer 2. The thickness of the slag layer can thus be derived from the signal which is characteristic for the slag layer 2 to be determined.

If the signals are recorded and stored during the measurement and are not evaluated until after the measurement, other possibilities for evaluation are known to also permit the determination of layer thickness' which are greater than the range of measurement of the first sensor. This can be achieved by ensuring an approximately constant probe speed. Under this condition the speed of the probe can be calculated from the signal of the first sensor. This speed can be used to extrapolate the distance signal to the melt to larger distances. The slag depth in this situation is the reading of the extrapolated distance signal at the point, where the second sensor generates its switch signal.

As one embodiment of the invention the second sensor can be constructed as an electromagnetic proximity switch, preferably of the inductive eddy current type. It is also within the scope of the invention to use a capacitive type, those sensors are known throughout the art and are sensitive to the surface of the top layer. For the use of the inductive type it is important to choose an adequate frequency of the second sensor according to ensure, that the signal is not affected by the metal melt. By selecting an adequately high working frequency (>10 MHz) for the second sensor, it can be ensured that even a thin slag layer sufficiently protects the field of this sensor from influences of the liquid metal which field will thus only be influenced by the slag layer.

According to another embodiment of the invention, the second sensor is constructed as an acceleration sensor by means of which a signal can be emitted when the probe impinges on the uppermost layer. At that moment an impact pulse due to the difference in density between air and slag (density of slag=2.5 ... 3.5 metric tons per cubic meter) is generated when the apparatus impinges on the slag. This pulse will be detected by the acceleration sensor because the impact pulse will cause a sound conducted through the solid housing of the apparatus. It can be evaluated to a switching signal which signal triggers the distance measurement of the inductive distance sensor.

This embodiment makes it possible to deter mine when the slag layer is reached over a large viscosity range of the slag, because the strength of the impact pulse may vary over a large range, it is only necessary to create a switching signal.

Both sensors described above as second sensors are effective through a heat-insulating casing (protective tube 4).

According to another embodiment of the invention the second sensor can be constructed as a contact in the tip of the probe. The contact between the tip of the probe and the slag can be determined by a capacitive discharge circuit. A capacitor is loaded to a high voltage. If the tip contacts the slag, the capacitor is discharged against the capacitor which is formed by the metallurgical vessel, resulting in a sudden change in capacitor voltage.

According to another embodiment of the invention the contact between the tip and the slag is detected by a resistive circuit, which detects the resistance between the contact at the tip of the probe and the slag layer, e.g. with a well known bridge. As the electrical conductivity of slag is usually low, both effects described above—the capacitive discharge effect and the change in resistance can be detected in combination.

Because the apparatus according to the invention does not depend on an external distance measurement, it is possible to construct the probe manipulator as a hand lance in order thereby to move the probe manually in the direction of the layers. This form of construction is appropriate under conditions of restricted space or for measurement situations such as those which exist for text measurements in which expenditure on a traveling device is uneconomic.

It is within the scope of the invention that the probe is provided as a removable unit on a lance. This enables a probe which is provided for layer thickness measurement to be easily replaceable by another probe, for example in order to determine other measurable quantities (temperature, oxygen content, sampling) or so as to be able to replace defective probes easily.

It also falls within the scope of the present invention to combine an apparatus for determining at least one other measurable quantity (see above) with the apparatus according to the invention in a lance, a probe or as part of the protective sleeve.

Description of Preferred Embodiments of the Invention

The first sensor, which determines the distance to the bath, is an electromagnetic sensor of the inductive eddy-current-type. This first sensor is built of two coils preferably circular and concentrical), an emitter coil 14 and a receiver coil 15. The primary coil is fed by a current with appropriate frequency (see above). The voltage which is received by the receiver coil 15 depends on the distance H between the first sensor (here: the receiver coil 15) and the surface of the metal melt 16. For details refer to Dodd, C. V.; Deeds, W. E.: Analytical solutions to Eddy-Current Probe-Coil Problems, Journal of applied physics, vol. 39, no. 6, May 1968.

The second sensor can be a proximity-switch-type of electromagnetic sensor. This sensor consists of a small (e.g. 1"×1") printed circuit board (PCB) 17 with two copper layers, one on the top 18 and one on the bottom 19. The lower copper layer is etched to form a coil. This coil is part of an oscillator, its electronic circuitry being placed on the top of the PCB. The top layer of copper is etched to form the connections between the electronic parts, which are typically of the surface mounted device (SMD) type. The oscillators frequency is appropriately chosen (see above). The signal of the oscillator is demodulated to get a signal of low frequency when approaching the slag. A circuit typically useful is described in FIG. 4:

An oscillator with appropriate working frequency is damped, if the slag approaches the coil L, which leads to a change in amplitude at the output of the oscillator. The output is capacitively coupled to a one-way-rectifier which, together with the low-pass-filter, forms an amplitude which is proportional to the rms-amplitude of the oscillator (demodulation). This amplitude is then compared with a set point, the output of this comparator is the switch signal Uswitch.

Figure 3:
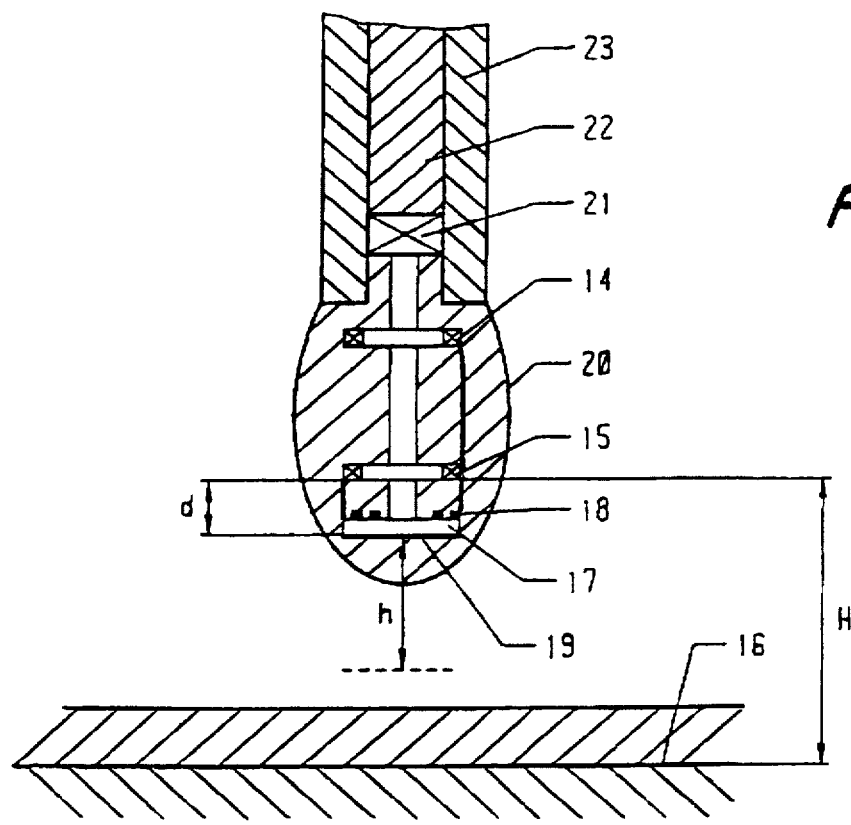
FIG. 3 illustrates a preferred embodiment of invention in cross section.

For the setup shown in FIG. 3 the evaluation unit has to take into account the distance between the two sensors d and the distance from the slag h, in which the second sensor generates the switch signal.

As the lance is moved towards a metal melt, the temperature in the vicinity of the surface of the slag layer can be very high. Therefore an appropriate housing of the two sensors is required. It is preferable to build this housing 20 of ceramic of the type which is known in foundry industry to build molds (molding sand). It is also within the scope of the invention to make the housing out of cardboard material or plastics.

At the top of the housing 20, a connector 21 is fixed which fits to the required type of lance 23.

The housing 20 is preferably connected to a cardboard sleeve 23. This cardboard sleeve protects the lance against heat and metal melt splashes. Such connectors and cardboard sleeves are available in many types from e.g. Minkon GmbH in Erkrath, Germany or Ferrotron GmbH in Moers, Germany or Electro-Nite International N.V. in Houthalen, Belgium.

It is to be understood that the embodiment described herein should not be taken in a limitative sense. The invention is to be broadly construed within the scope of the appended claims.

Having thus described the invention and illustrated its use, what is claimed as new and is desired to be secured by Letters Patent is:

1. An apparatus for instantaneously determining the thickness of a hot slag layer on a metal melt in a metallurgical vessel, the improvement comprising a lance manually shiftable toward said melt, a sensor arrangement comprising two sensors mounted on said lance proximate the lance tip, a first said sensor being constructed as an inductive eddy current type of proximity sensor for generating a signal indicating the distance of said first sensor to the metal melt, and a second sensor in predetermined spatial relation to said first sensor, said second sensor being adapted to emit a signal when said second sensor reaches a predetermined distance relative to the slag layer and to trigger said first sensor when said second sensor emits its signal, and evaluation means for receiving the signals of said first and second sensors and deriving the thickness of said slag layer as a function of the signals of said first and second sensors.

2. Apparatus in accordance with claim 1 wherein said second sensor is constructed as an inductive eddy-current type of proximity switch.

3. Apparatus in accordance with claim 1 wherein said second sensor is constructed as capacitive type of proximity switch.

4. Apparatus in accordance with claim 1 wherein said second sensor is constructed as a capacitive discharge type of sensor.

5. Apparatus in accordance with claim 1 wherein said second sensor is constructed as an electrical contact type of sensor.

6. Apparatus in accordance with claim 1 wherein said first and second sensors are surrounded by a protective housing.

7. The method of instantaneously measuring the thickness of a hot slag layer on the surface of a metal melt which comprises the steps of providing an inductive eddy-current proximity sensor adapted, upon activation, to generate a first signal indicative of the spacing of said proximity sensor from the surface of said melt, providing a second sensor in predetermined spaced relation to said proximity sensor, said second sensor being adapted to activate said proximity sensor responsive to said second sensor being disposed at a predetermined distance relative to the surface of said slag layer advancing said sensors toward said melt in a direction generally perpendicular to said surface of said slag layer until said second sensor is disposed at said predetermined distance from said slag layer surface, and determining the thickness of said slag layer by subtracting said predetermined distance from the spacing of said proximity sensor from said melt at the instant of activation.

8. The method of claim 7 wherein said predetermined distance is zero.

9. The method of claim 7 wherein said proximity sensor and second sensor are in coplanar alignment.

* * * * *